(12) United States Patent
Smolinski et al.

(10) Patent No.: US 8,572,025 B2
(45) Date of Patent: Oct. 29, 2013

(54) DATA MANAGEMENT SYSTEM FOR PORTABLE MEDIA DEVICES AND OTHER DISPLAY DEVICES

(75) Inventors: Greg Smolinski, Aurora, NY (US); Ron Parker, Conesus, NY (US)

(73) Assignee: Tau Cygnus, LLC, Aurora, NY (US)

( * ) Notice: Subject to any disclaimer, the term of this patent is extended or adjusted under 35 U.S.C. 154(b) by 261 days.

(21) Appl. No.: 12/643,315

(22) Filed: Dec. 21, 2009

(65) Prior Publication Data

US 2010/0161090 A1   Jun. 24, 2010

Related U.S. Application Data

(60) Provisional application No. 61/140,164, filed on Dec. 23, 2008.

(51) Int. Cl.
*G06F 7/00* (2006.01)
*G06F 17/00* (2006.01)

(52) U.S. Cl.
USPC .......................................... 707/609; 707/634

(58) Field of Classification Search
None
See application file for complete search history.

(56) References Cited

U.S. PATENT DOCUMENTS

| | | | |
|---|---|---|---|
| 6,928,433 | B2 | 8/2005 | Goodman et al. |
| 8,458,606 | B2* | 6/2013 | Sloo .............................. 715/764 |
| 2004/0224638 | A1* | 11/2004 | Fadell et al. ................. 455/66.1 |
| 2006/0112144 | A1 | 5/2006 | Ireton |
| 2006/0179078 | A1 | 8/2006 | McLean |
| 2006/0195790 | A1* | 8/2006 | Beaupre et al. ............... 715/727 |
| 2006/0218195 | A1* | 9/2006 | LaChapelle et al. ....... 707/104.1 |
| 2007/0022156 | A1 | 1/2007 | Grubbs |
| 2007/0033225 | A1 | 2/2007 | Davis |
| 2007/0038647 | A1 | 2/2007 | Thomas et al. |
| 2007/0180383 | A1* | 8/2007 | Naik ............................. 715/727 |
| 2007/0230910 | A1 | 10/2007 | Welch et al. |

(Continued)

FOREIGN PATENT DOCUMENTS

| | | |
|---|---|---|
| DE | 202006009376 U1 | 11/2006 |
| GB | 2349267 A | 10/2000 |

(Continued)

OTHER PUBLICATIONS iPod touch Features Guide, Apple Computer, Inc., 019-1215, Mar. 2008.

(Continued)

*Primary Examiner* — Hung T Vy
*Assistant Examiner* — Tuan A Pham
(74) *Attorney, Agent, or Firm* — Brown & Michaels, PC

(57) ABSTRACT

The present invention includes a method of navigation/manipulation and display of media or data residing on a media player type device or other limited display system. The method includes a non-hierarchical intelligent associative reorganization of the media player database as stored on the media device. The method implements a technique to display the database entries that promotes the application of associative connections by the user to the database entries during the navigation of the database. Therefore, the selection of media objects or data entries that make up a play list as it is generated by the user is constructed using associative connections while the user traverses the non-hierarchical presentation of the database. The present invention also includes a remote control data management system that includes a docking station and a remote control unit that maintain and manipulate metadata in one or more databases even after a media player has been disconnected.

22 Claims, 9 Drawing Sheets

(56) References Cited

U.S. PATENT DOCUMENTS

| | | |
|---|---|---|
| 2007/0239781 A1 | 10/2007 | Kraft et al. |
| 2008/0065988 A1 | 3/2008 | Gupta et al. |
| 2008/0066100 A1 | 3/2008 | Brodersen et al. |
| 2008/0126933 A1 | 5/2008 | Gupta et al. |
| 2008/0212945 A1* | 9/2008 | Khedouri et al. ............. 386/124 |
| 2008/0250319 A1* | 10/2008 | Lee et al. ..................... 715/716 |

FOREIGN PATENT DOCUMENTS

| | | |
|---|---|---|
| GB | 2363230 A | 12/2001 |
| KR | 100353159 B1 | 9/2002 |
| KR | 1020020069418 A | 9/2002 |
| WO | 0128222 A3 | 4/2001 |

OTHER PUBLICATIONS

"Genius makes iTunes 8 a worthy upgrade." http://news.cnet.com/8301-13526_3-10039744-27.html, Sep. 11, 2008.

"Dangerously-slim player is the best non-touchscreen iPod yet." http://www.macworld.com/article/135554/2008/09/ipodnano4g.html, Sep. 16, 2008.

DLO HomeDock Deluxe webpage, http://dlo.com/products/homedoc_dx_Prod.tpl, earliest known date Jan. 12, 2006.

DLO HomeDock Music Remote webpage, http://dlo.com/Products/mr_Prod.tpl, earliest known date May 18, 2007.

Jow Tong webpage, http://jow-tong.com.tw/products_detail.asp, earliest known date Oct. 19, 2007.

iPod mini User's Guide, Apple Computer, Inc., 034-2596-A, 2004.

iPod Features Guide, Apple Computer, Inc., 019-0782, Sep. 2006.

* cited by examiner

DATA MANAGEMENT SYSTEM FOR PORTABLE MEDIA DEVICES AND OTHER DISPLAY DEVICES

REFERENCE TO RELATED APPLICATIONS

This application claims one or more inventions which were disclosed in Provisional Application No. 61/140,164, filed Dec. 23, 2008, entitled "DATA MANAGEMENT SYSTEM FOR PORTABLE MEDIA DEVICES AND OTHER DISPLAY DEVICES". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of remote controls. More particularly, the invention pertains to remote controls for portable media devices, including, but not limited to, MP3 players.

2. Description of Related Art

Portable media devices have become an increasingly popular method for consumers to store and playback their personal media collections. The growth in the number of digital audio and video players in the consumer market has created a need for accessories which allow the consumer to choose how they access and experience their media collection.

In general, a personal computer is required to manage and develop a database of media content that can then be transferred to a portable media device. The media content on these portable media devices can then be played back directly on the media device itself or through an external playback system, such as a home theatre unit, via a docking station or other intermediate connection.

The more sophisticated docking stations have multiple video/audio output connectors to couple with an external playback system. While composite and S-video connectors for video, and RCA connectors for audio, are the most commonly used types of connectors, the connectors can be of any standard or non-standard communication link. Most docking stations are capable of recharging the portable media device when it is docked. Some docking stations have a microchip/microprocessor and internal cache memory and/or RAM in order to access, download and operate on the data from a docked portable media device, typically using the application software provided by the media device itself.

The docking stations are often supplied with a remote control to give a degree of portability back to the user once the portable media device is docked. The range of remote controls supplied with the different docking stations varies in both capability and functionality. The more advanced remotes have an LCD to give the user the capability to better navigate and manipulate the media content on the portable media devices. Either IR or RF is used for wireless communication between the remote and the docking station.

The navigation and presentation of the data on these portable media devices is an integral and important feature. The more advanced remote controls with the LCD interface present the data from the docked portable media player in one of two ways: either by using proprietary software for navigating the media content or by replicating the portable media device's interface and presenting it to the user. In either case, the data is presented in a hierarchical manner as a means of navigating through the media content. The navigation and playback of the media content can be performed either by the remote control and/or the docking station. In most cases, a portion of the data content is downloaded to either the docking station or the remote control prior to data navigation.

The current state-of-the-art remote control systems for the iPod® media device and other MP3 players are limited to playback options of the song database on the MP3 player, for example skip to the next song, pause, play, rewind to the last song etc. The most advanced remote solutions implement the database manipulation strategy of the MP3 player. As an example, the iPod® media device includes software and serial communication hardware to allow third party control of the iPod® electronic device, by extension, a remote with an LCD screen can accurately represent the user interface of the iPod® media device. A disadvantage of this method is that, in order to maintain playback control while simultaneously providing the capability of navigating through the database, the serial communication interface must be used. This causes delays in the presentation of the data due to the limited baud rate of the serial interface.

A further limitation of current advanced remote devices and media devices in general is that the hierarchical menu scheme limits potential associative connections that the user may identify between various media entries and their associated metadata as listed in the hierarchical tree structure. Further, on portable devices, the user is limited to moving through the media entries with a limited presentation of the hierarchical menu scheme, which may result in no associative connections between the various media entries.

There is also a lack of capability for true data manipulation; to modify (ie add/delete media entries), moving the entries up or down in a playback list, renaming of data entries/playback lists, or reordering data entries in a non-alphanumeric scheme.

There is a need in the art for a remote control data management system that is able to download and present the metadata, without being limited to the capabilities of the media player. Also, there is a need in the art for a system that presents metadata or information content of the entries of a database (for example song entries) to the user in such a manner that associative connections between the various entries are promoted. In addition, the capability of true data manipulation/management and retaining the metadata once communication is terminated with the media device is needed.

SUMMARY OF THE INVENTION

The present invention includes a method and device that can download metadata and create one or more databases. The metadata and the database(s) are kept on either the docking station or the remote control unit itself. The system therefore is able to manipulate the information in the database(s), without the media player being docked, allowing the user access to multiple media databases from multiple media devices. While a preferred embodiment of the present invention can only play music that is stored on the currently docked media player, other embodiments allow the creation and manipulation of all stored metadata from previously docked media players.

A preferred embodiment of the invention includes a docking station and a remote control unit, wirelessly connected, where the remote has a screen and buttons, or other input devices, for interaction with the user interface.

In another embodiment, a method presents the information to the user in a non-hierarchical intelligent associative reorganization of the metadata. The method promotes the application of associative connections by the user to the database entries during the navigation of the database. Therefore, the selection of media objects or data entries that make up a playlist as it is generated by the user, is constructed using associative connections of the user while the user traverses the non-hierarchical presentation of the database.

In a preferred embodiment of the present invention, all media entries or a subset thereof, are displayed as a list. The user can then select attributes of the metadata associated with the currently selected entry. The list of the media entries are updated with the relevant attribute as the primary focus in the media reordering. In this manner, a user can quickly traverse the media database, applying their unique associative connections to the media content that will be selected for a playlist or for immediate playback.

The metadata is displayed to the user in a list-view where the center entry always has focus. This entry will have additional attributes displayed to the user. Based on those attributes, the user can select one or more attributes to reorder the list. The new list will be reordered about the center focus entry referred to as the "pivot point". This pivot point is the original entry the user used to apply associative connections, and remains in the forefront and retains its focus. The pivot point always remains in the center of the list-view while the other entries are reordered around it. The entire database can be reordered based on these attributes or alternatively other attributes can be selected as a filter and applied to the database, reducing the number of metadata objects to scroll through via the list view.

The entire media list, or a subset thereof, can be continually displayed on a single screen with the list pivoting about the selection with focus, according to the desired category/attribute selected by the user. In one embodiment, the attributes may be filtered to further narrow the quantity of items that pertain to a search, eliminating certain attributes and thus songs/media that interfere with the associative connections desired by the user.

BRIEF DESCRIPTION OF THE DRAWINGS

FIG. 1b shows the remote control data management system of FIG. 1a.

DETAILED DESCRIPTION OF THE INVENTION

Figure 1A:
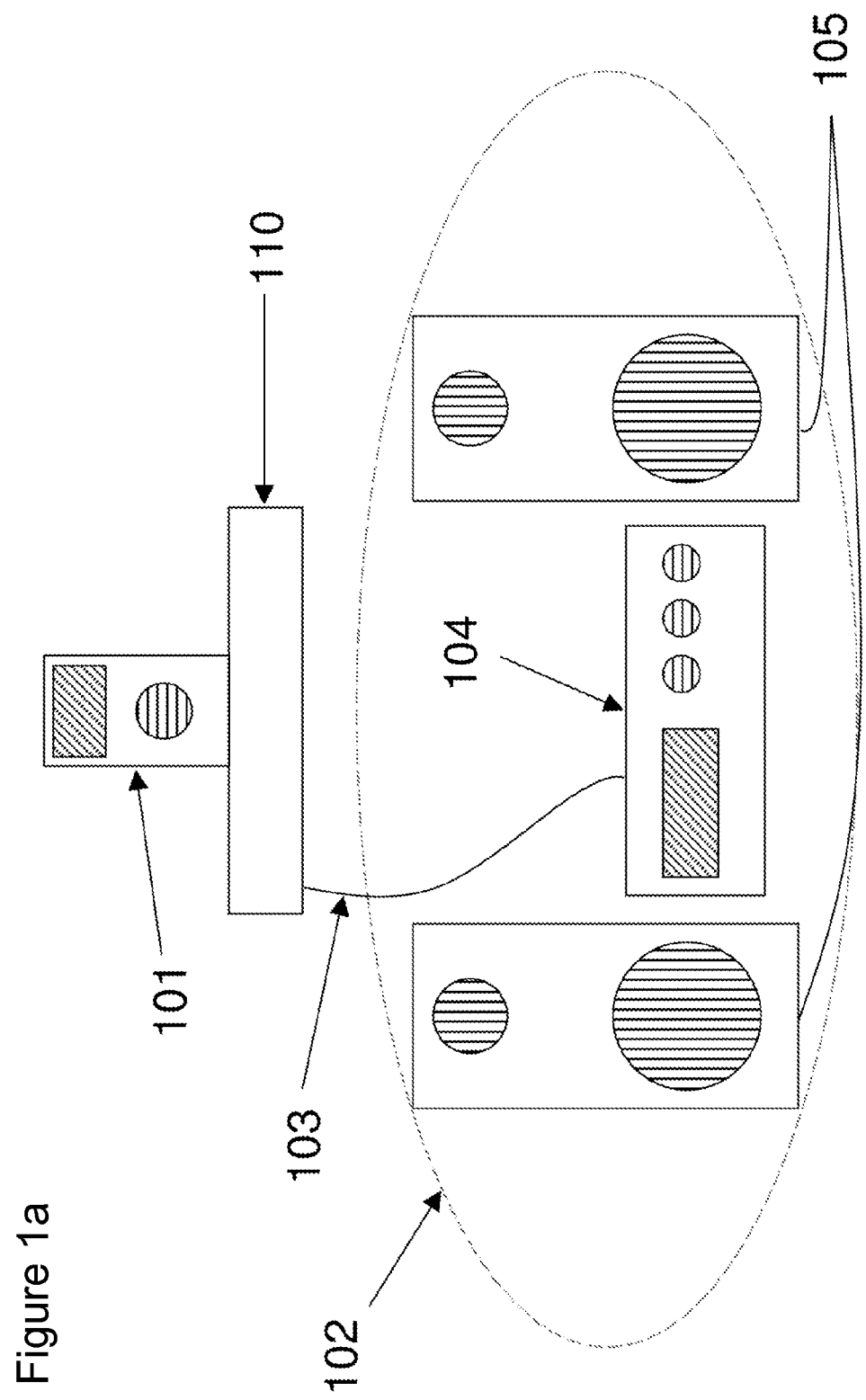
FIG. 1a shows a remote control data management system for a portable media player coupled to an amplification device in an embodiment of the present invention.

A "media file", as defined herein, includes any digital or analog file or other data, which may include, but is not limited to, documents, video files, audio files, images, or any combination thereof. In a preferred embodiment, media files are digital media files.

Media Player Interface

The present invention remotely controls media devices as well as portable media devices including, but not limited to, MP3 players. In a preferred embodiment, the present invention is used with an iPod® media device. The remote control data management system of the present invention preferably includes a docking station (also referred to as the satellite base station herein) and a remote control unit, and provides the consumer/user data management and navigation capability for media devices. In addition, the data management system can be connected to an external playback system, including, but not limited to, home stereo units, televisions, and powered speakers that interface the media device to hardware of the consumers' choosing. In this preferred embodiment, the remote control data management system does not rely on the media player interface. Instead, it downloads and stores metadata from all of the entries found on the media device into a database created on the docking station, and/or the remote control unit. In this manner, the device permits manipulation of the database without a media player being connected. This allows a user to manage multiple databases from multiple media players, however still being limited to only playing files on the physically connected media device.

In a preferred embodiment of the present invention, a remote control data management system for media players includes database management capabilities via a handheld remote control unit and a satellite base station/docking station without the requirement of a connection to a personal computer. Communication between the two components is preferably accomplished through radio frequency transmission.

Once the database is created, the software then gives the user database management capabilities in addition to playback control of the media device. Some of the management capabilities include, but are not limited to, the creation or deletion of a play list, the modification of a play list via the deletion or addition of media entries, the modification of the play list order, the active management of a media queue, the ability to do alpha-numeric searches on the media entry database, the storage of multiple databases and play lists associated with individual media players, the ability to recognize unique media players and their associated media content and play lists and the ability to cross correlate and integrate multiple play lists from multiple unique media players.

Since the present invention provides a full database management system that does not require the media player to be connected to a personal computer, the system allows for rapid data manipulation and rapid play list development and creation, manipulation and storage. The system stores multiple versions of unique databases and play lists for each media player as they are docked, allowing play list manipulation and query for undocked media players at a later date.

The docking station sends information to the media player to allow for the sequential play of the media content in the current play list that has been sent by the remote control unit. Upon manipulation of the play list by the hand held remote control unit, the currently playing list is replaced. Wi-Fi communication data rates make this seamless. The use of Wi-Fi also allows for communication between the remote and the satellite base station with nominally up to 300 feet separation.

Because a local database to the handheld and the remote is invoked, very fast manipulation of the media database is possible. Thousands of media entries may be searched and the media entries reduced to a number the user desires to play in the active play list. This is becoming increasingly important as the capacity of media players keep increasing, currently allowing more than 10,000 media entries to reside in a single media player.

Figure 1C:
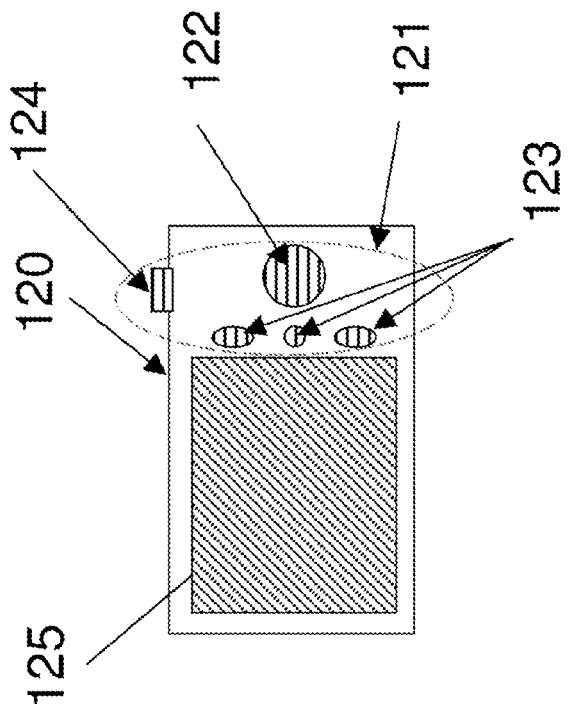
FIG. 1c shows the remote control of the remote control data management system.
Figure 1B:
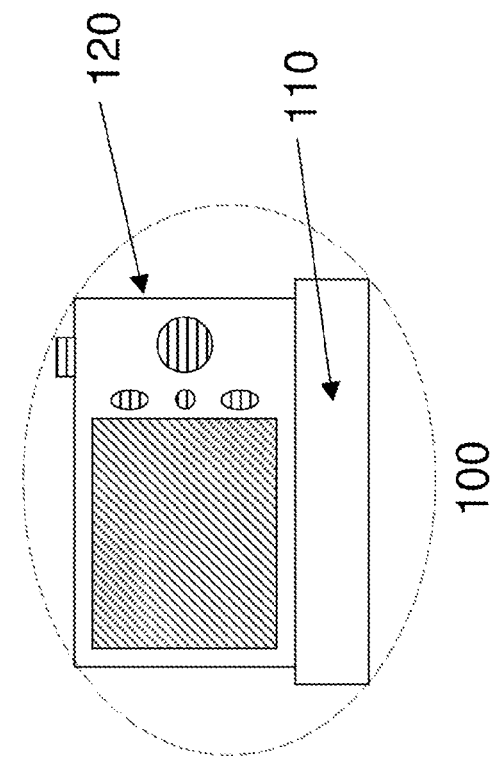

FIGS. 1*a* through 1*c* shows a media player remote control interface (100) in an embodiment of the present invention. The remote control data management system (100) includes a docking station (110) and a remote control unit (120). The remote control unit (120) (FIG. 1*c*) is preferably wireless. The docking station (110) docks a portable media player (101) (FIG. 1*a*) as well as the remote control unit (120) (FIG. 1*b*). As shown in FIGS. 1*a* and 1*b*, the docking station (110) has a slot to dock the remote control unit (120) horizontally and a slot to dock the portable media player (101) vertically. In other embodiments, the remote control unit (120) and the portable media player (101) are both docked in the same orientation, either vertically or horizontally, or the remote control unit (120) is docked vertically and the portable media player (101) is docked horizontally. The docking station (110) can then connect to an accessory to play back the media content of the portable media player (101). The accessory shown in FIG. 1 is a home entertainment system (102), which includes a stereo (104) and speakers (105), to which the data management system (100) is connected by a communication wire (103).

The remote control unit shown in FIGS. 1*b* and 1*c* includes a display screen (125) and buttons (121) to manipulate the software that controls the satellite base station (110) server. In one embodiment, the screen is a color LCD panel. As an example, the view screen (125) may be a QVGA screen (320×240) pixel color display. In other embodiments, other types of screens, screen sizes and resolutions may be used. The font type and size may also vary.

In one embodiment, the remote control has a five-function button pad (122), three separate buttons (123), which are associated with immediate volume control, and a function button (124) on the top of the remote control unit (120). The ergonomics of this layout make for simple menu manipulation of the software. While the configuration in FIG. 1 shows three buttons (123) and a five-function button pad (122), varying the number of buttons and using a different manner to navigate the view screen (125) other than the five function button pad are also within the spirit of the invention. In one embodiment, a touch screen interface replaces or enhances the five function button pad (122). In another embodiment, a touch pad is incorporated. While the remote control unit also preferably contains a rechargeable battery, it may alternatively use disposable batteries. The function button (124) is a key that provides whatever functions it is programmed to provide. As an example, the function button (124) may act as a navigation key to reverse out of, or alternatively choose, different levels of the menu.

The software on the remote control data management system (100) allows for the display and selection of media objects to be processed by the portable media player (101) through the docking station (110), which may be connected to an external playback system (102). The external playback system preferably includes speakers (105). Some examples of the external playback system include, but are not limited to, a home stereo, a personal stereo, a home theater system, a television, or other amplification means. In another embodiment, the external playback system is simply powered speakers.

Communication between the docking station (110) and the handheld remote control unit (120) is preferably performed using Wi-Fi. In one example, the Wi-Fi is 802.11b/g Wi-Fi. Wi-Fi chip sets are included in the docking station (110) and the remote control unit (120). Wi-Fi communication is accomplished using known Wi-Fi standard protocols. Software on the docking station (110) controls and accesses the media player (101) and services the remote control unit (120). In one embodiment, Windows CE provides the basic operating system for the remote control unit (120). In other embodiments, other known operating systems are utilized. Software on the handheld remote control unit (120) manipulates the stored database/metadata, and incorporates a rich user interface to present information to the user.

In other embodiments, other RF standards including, but not limited to, Zigbee® wireless delivery, are used for communication between the remote control unit (120) and the docking station (110).

The docking station (110) acts as an interface between the media player (101) and the external playback system (102). The control electronics of the docking station (110) include an embedded processor to access data from the media player and allow storage of that data, or a modification of that data, on the docking station. The connection of the docking station (110) to the media player (101) allows extraction of the metadata from the media player (101) using the USB interface. A digital serial interface is also enabled to allow for control of the media player (101) in song playback mode. The docking station (110) has power input with feeds to charge the docked media player (101) and to also charge the integral handheld remote device (120), simultaneously if needed. The docking station (110) can contain various connectors to couple different media devices. As an example, in order to dock an iPod® media player, a 30-pin connector is used in the docking station (110).

The docking station (110) is capable of audio and video output to an external playback system (102). In a preferred embodiment, an S-Video and Composite Audio/Video Jacks are used. In other embodiments, other audio/video outputs may be used. The outputs stream media content from the docking station (110) to an external playback system (102). The audio channels are connected to the media player (101) output pins with an additional conditioning circuit to allow volume control and/or muting of the signal from the media player (101) to the connected external playback system (102). The docking station (110) contains memory to store the necessary software and to allow storage of custom media databases. The docking station (110), as well as the handheld remote (120), is able to store multiple databases from multiple media players (101). The handheld remote unit (120) manages the playing order of the media content. The docking station (110) software in turn controls the playing of the media content on the media device (101) according to the entry order received from the handheld (120).

After the metadata has been downloaded from the media player (101) and a database has been created, the docking station (110) then gains control of the media player (101) for playback of media content. As an example, once the metadata from an iPod® media device has been downloaded and a database of that metadata has been created on the system, the connection between the docking station (110) and the iPod® media device is switched from USB to serial so as to gain control of the iPod® media device playback functions. In addition, the present invention permits play lists to be created and stored on the handheld device (120) independent of the media player (101). These play lists may be created, played, and manipulated actively while the media player (101) is playing one or more media entries from a currently selected play list. The docking station (110) software controls the execution of the last loaded play list from the hand held remote (120). The docking station (110) software also checks for commands from the remote control unit (120) to increase/decrease volume or mute volume. The docking station (110) software also controls the timing of uploaded media content associated with the current play list, to the hand held remote control unit (120) for display on the screen (125).

In an embodiment of the invention, a Wi-Fi connection between the handheld remote (120) and the docking station (110) exists such that the system can be programmed to access information from the internet if a local Wi-Fi hub is detected. This allows the hand held remote control unit (120) to query the internet for metadata including, but not limited to, song lyrics and album artwork, associated with songs currently in the play list. Also, since the system has the capability to retain databases and play lists associated with any previously docked media player (101), the user has the ability to peruse any database and play list, even after the media players have been disconnected from the system. In this way, the user can select media content from a previously docked media player that does not exist on their personal media device and mark that entry for later purchase. For example, a song can be marked for purchase via an internet service such as the iTunes® store.

As an example, imagine that someone using the system of the present invention has a party where her friends bring their iPod® media players and share their songs. After the party, the user may decide to purchase some of the songs that were playing on each of the iPod® media players brought by her friends. The internet connection allows transmission of the song data so that the purchase can be easily implemented the next time the user logs onto the iTunes® music store.

The remote control unit (120) provides the display (125) and manipulation of the local database. Containing the database in local memory allows for the construction of play lists dynamically and very quickly, which is an important feature of the present invention. The information (which, for example, can be more than 10,000 song entries for an MP3 player with a 30 GB hard drive) is displayed to the user so that play lists may be constructed based on various types of searches. The screen (125) on the remote control unit (120) preferably has enough resolution to present sufficient information to the user and also allow video/graphics to be displayed.

Previously constructed play lists and the dynamic play list can be stored and/or manipulated at will. The user may move the entries in the play list order, delete entries or add entries at will. If the dynamic play list is modified, then that active play list is sent to the docking station (110) asynchronously to update the currently executing play list. In this way, the user may modify the play list, continuously if desired. Play lists are stored with a unique identifier to associate with the proper media player (101). In this way, when a previously docked media player is re-docked for playback, the correct database and play lists are displayed to the user.

In an alternative embodiment of the present invention, the docking station includes a built in compact disc player allowing the storage of uncompressed audio tracks onto a built in large hard drive.

In another alternative embodiment, the device is configured to operate as a universal remote. The docking station (110) is configured to transmit infrared signals to stereo and television components. Also, the remote (120) may have an infrared transmitter and receiver. The use of the docking station (110) simultaneously with the hand held remote control unit (120) allows operation of the stereo components from a greater distance than standard infrared enabled remote controls. For example, the stereo volume, radio channels etc could be controlled from another region of the house or from outside with a range of 300 feet or more.

In yet another embodiment, the remote control unit described above is replaced with a Wi-Fi enabled PDA used with the appropriate software to control the docking station. The form factor and keypad layout may not be as convenient as that of the remote control unit described herein. This embodiment would also require modified software and a modified docking station.

In an alternative embodiment, the remote control unit is an internet tablet. In this embodiment, the software is modified to allow for the differences of the user interface and operating system.

In yet another embodiment, a personal computer could be considered as the remote interface.

In other embodiments, an iPhone® cellular phone or other Wi-Fi enabled device replaces the remote control unit described above.

System of Displaying and Navigating Data

Another embodiment of the present invention is a method of navigation/manipulation and display of media or data residing on a media player type device or other limited display system. This embodiment may be used in combination with the remote control data management system (100) described above, or alternatively, it may be used with any database having metadata information about files. Some examples of where this embodiment may be used include, but are not limited to, metadata on a media player, a database of digital photographs, an electronic archive of videos and movies, game listings, collection of information related to a hobby or interest, or information on a personal computer. All of these examples are examples of media files, as defined herein.

The method that presents the information to the user includes a non-hierarchical intelligent associative reorganization of the media player (101) database as stored on the data management system (100). The method in this embodiment implements a technique to display the database entries, which is more intuitive and functional to the user than the prior art. The method promotes the application of associative connections by the user to the database entries during the navigation of the database. The media objects or data entries that comprise a play list generated by the user are constructed using associative connections by the user while traversing the non-hierarchical presentation of the database.

Organization of songs on the remote control unit (120) is used herein as an example of this embodiment of the invention. Typically, existing databases for media players (101) are comprised of a hierarchical organization to allow the user to select an attribute or metadata such as album, artist, genre, track number etc., or more generally all of the songs in a database alphanumerically. The user must select a given attribute, which would then expose all of the songs in an alphanumeric order with that attribute. Songs that do not have the selected attribute will not be displayed. This is a somewhat clumsy organization of the song database for the purpose of selecting individual songs with differing attributes during the creation and manipulation of a given playlist.

The present invention provides a much easier way to organize and select individual songs with different attributes. In the example of organization of a listing of metadata, the present invention is capable of sorting the data with relation to the attributes of a particular song of interest (termed the song in "focus" or the "focus song" herein), rather than on the general attributes alone. The song in focus becomes the pivot point for ordering and reordering the list.

A preferred embodiment of the present invention presents the entire song list alphanumerically. The method then allows the user to select categories for reorganization of the entire list, or a subset of the list, which are based upon a single entry, which has the focus at the time of the selection. Therefore the list of the songs is updated with the relevant attribute given the focus in the song ordering. In this manner, a user can quickly traverse the song database, applying their unique associative connections to the songs that will be selected for a play list or to play. The entire song list, or a subset, can be continually displayed on a screen (125) with the list pivoting about the selection with focus, according to the desired category selected by the user. Filter attributes can be used to further narrow the quantity of items that pertain to a search, eliminating certain attributes and thus songs that interfere with the associative connections desired by the user.

Figure 2:
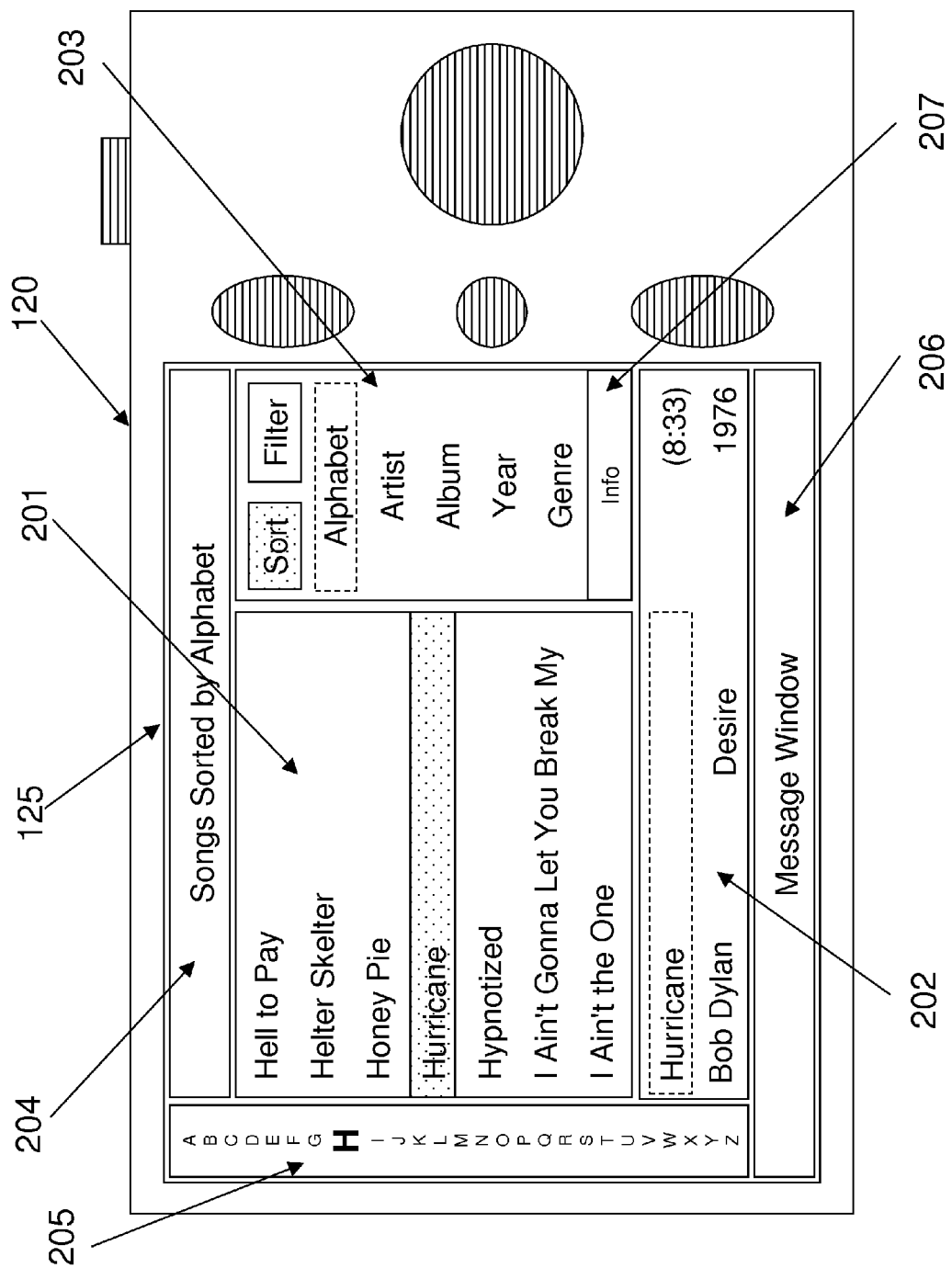
FIG. 2 shows a preferred embodiment for intelligent associative sorting of the song database on a remote control unit in a method of the present invention.

In an embodiment of the invention shown in FIG. 2, the user is able to view and select objects from the database on the view screen (125) of the display device. In a preferred embodiment, the display device is the remote control unit (120). The screen size in this embodiment is relatively small to ensure that the remote control unit (120) has portability. One method in which the data is presented to the user is illustrated in FIG. 2. The main window (201) displays to the user the data entries in the database, where for this example, a list of songs is shown. An example of a song database is listed in Table 1, where the database is sorted according to song titles alphanumerically in accordance with the main window (201) presentation of song entries. Table 1 shows an example only, the database may include any combination and number of songs. Along with the main window (201), there is the focus window (202), the sort/filter window (203), the information window (204), the alphanumeric window (205), and the message window (206). The message window (206) can provide messages to the user. For example, the message window (206) may provide directions to the user as to how to navigate the system. There is preferably also an information button (207), which, when pressed, takes the user to a new screen and displays all of the metadata associated with the song currently in focus.

TABLE 1

| Item | SONG | ALBUM | ARTIST | GENRE | YEAR |
|---|---|---|---|---|---|
| 1 | Africa Bamba | Supernatural | Santana | Rock | 1999 |
| 2 | Already Gone | Their Greatest Hits (1971-1975) | The Eagles | Rock | 1976 |
| 3 | Best of My Love | Their Greatest Hits (1971-1975) | The Eagles | Rock | 1976 |
| 4 | Better Days | Faith | Faith Hill | Country | 1998 |
| 5 | Black Diamond Bay | Desire | Bob Dylan | Rock | 1976 |
| 6 | Cold as Ice | Foreigner | Foreigner | Rock | 1977 |
| 7 | Complicated | Let Go | Avril Lavigne | Rock | 2002 |
| 8 | Desperado | Their Greatest Hits (1971-1975) | The Eagles | Rock | 1976 |
| 9 | Down to the Waterline | Dire Straits | Dire Straits | Rock | 1978 |
| 10 | Free Bird | Pronounced Leh-Nerd Skin-Nerd | Lynyrd Skynyrd | Rock | 1973 |
| 11 | Hell to Pay | Longing in Their Hearts | Bonnie Raitt | Rock | 1994 |
| 12 | Helter Skelter | The Beatles [White Album] Disc 2 | The Beatles | Rock | 1968 |
| 13 | Honey Pie | The Beatles [White Album] Disc 2 | The Beatles | Rock | 1968 |
| 14 | Hurricane | Desire | Bob Dylan | Rock | 1976 |
| 15 | Hypnotized | Mystery To Me | Fleetwood Mac | Rock | 1973 |
| 16 | I Ain't Gonna Let You Break My | Nick of Time | Bonnie Raitt | Rock | 1989 |
| 17 | I Ain't the One | Pronounced Leh-Nerd Skin-Nerd | Lynyrd Skynyrd | Rock | 1973 |
| 18 | Isis | Desire | Bob Dylan | Rock | 1976 |
| 19 | Joey | Desire | Bob Dylan | Rock | 1976 |
| 20 | Just Crazy Love | Mystery To Me | Fleetwood Mac | Rock | 1973 |
| 21 | Love Ain't Like That | Faith | Faith Hill | Country | 1998 |
| 22 | Lyin' Eyes | Their Greatest Hits (1971-1975) | The Eagles | Rock | 1976 |
| 23 | Maria, Maria | Supernatural | Santana | Rock | 1999 |
| 24 | Mozambique | Desire | Bob Dylan | Rock | 1976 |
| 25 | Ob-La-Di, Ob-La-Da | The Beatles [White Album] Disc 1 | The Beatles | Rock | 1968 |
| 26 | One of These Nights | Their Greatest Hits (1971-1975) | The Eagles | Rock | 1976 |
| 27 | Revolution 9 | The Beatles [White Album] Disc 2 | The Beatles | Rock | 1968 |
| 28 | Setting Me Up | Dire Straits | Dire Straits | Rock | 1978 |
| 29 | Sexy Sadie | The Beatles [White Album] Disc 2 | The Beatles | Rock | 1968 |
| 30 | So Far Away | Brothers in Arms | Dire Straits | Rock | 1985 |
| 31 | Take It Easy | Their Greatest Hits (1971-1975) | The Eagles | Rock | 1976 |
| 32 | Tequila Sunrise | Their Greatest Hits (1971-1975) | The Eagles | Rock | 1976 |
| 33 | The City | Mystery To Me | Fleetwood Mac | Rock | 1973 |
| 34 | Too Much to Ask | Let Go | Avril Lavigne | Rock | 2002 |
| 35 | Tuesday's Gone | Pronounced Leh-Nerd Skin-Nerd | Lynyrd Skynyrd | Rock | 1973 |
| 36 | Unwanted | Let Go | Avril Lavigne | Rock | 2002 |
| 37 | Walk of Life | Brothers in Arms | Dire Straits | Rock | 1985 |
| 38 | Why | Mystery To Me | Fleetwood Mac | Rock | 1973 |
| 39 | Why Worry | Brothers in Arms | Dire Straits | Rock | 1985 |
| 40 | Witchy Woman | Their Greatest Hits (1971-1975) | The Eagles | Rock | 1976 |
| 41 | Woman in Black | 4 | Foreigner | Rock | 1981 |
| 42 | Yer Blues | The Beatles [White Album] Disc 2 | The Beatles | Rock | 1968 |
| 43 | You | Longing in Their Hearts | Bonnie Raitt | Rock | 1994 |
| 44 | Your Latest Trick | Brothers in Arms | Dire Straits | Rock | 1985 |

The main window (201) includes a list of the objects or data according to an attribute or metadata selected by the user. Seven items are displayed in FIG. 2 on the main window (201) at any one time due to the limited pixel density and font size chosen for ease of use and portability, but other densities, font sizes, and numbers of items displayed are also within the spirit of the present invention. The number of items displayed will vary depending upon the font size, pixel density, and screen size of a particular display device.

In this example, the main window (201) displays the data list where the central object in the list always has focus. The song "Hurricane", being the central data object in the main window (201), also known as the focus song, has its attributes exposed in the focus window (202). As the user scrolls up and down the data list in the main window (201), the attributes for the song in the focus window (202) change as a new entry is placed in the central location of the main window (201). During the navigation process, the main attributes of the central listed song in the main window (201) will always be displayed in the focus window (202). In addition, the main window (201) will list the songs most closely associated with the present attribute selection chosen in the sort/filter window (203). The sort/filter window (203) indicates how the songs are being sorted with respect to the song that has focus in the main window (201). During the navigation, the user may select another attribute of the song in focus in the sort/filter window (203) to initiate the reorganization and redisplay of the entire database. Thus, the main window (201) will pivot about the song in focus, according to the attribute that has been selected, with the other entries in the list being populated with attributes nearest the one selected in the sort/filter window (203).

A preferred embodiment of the invention includes intelligent associative sorting of the song database using the associative connections initiated by the user. To enable this method, a song in the center of the main window (201) is given focus, and the rest of the song list is populated around it. In FIG. 2, the song "Hurricane" is in focus. Some of the main attributes or metadata of this song, which are listed in the focus window (202), include the album: "Desire", the artist: "Bob Dylan", the year of the song: "1976" and the length of the song: "8:33". This represents only a particular selection of attributes that a user may prefer to view for a particular song selection. Other attributes not contained in the local database may be obtained by gathering additional metadata. Some of these attributes include, but not limited to, artist, song name, album name, year released, genre, length of song, composer, lyrics and record label. This additional metadata may be obtained, for example, from an internet connection or by using the docking station and remote control unit described in an earlier embodiment of the present invention. In addition, the attributes can be used as a filter to minimize the list of songs displayed to the user.

Figure 3:
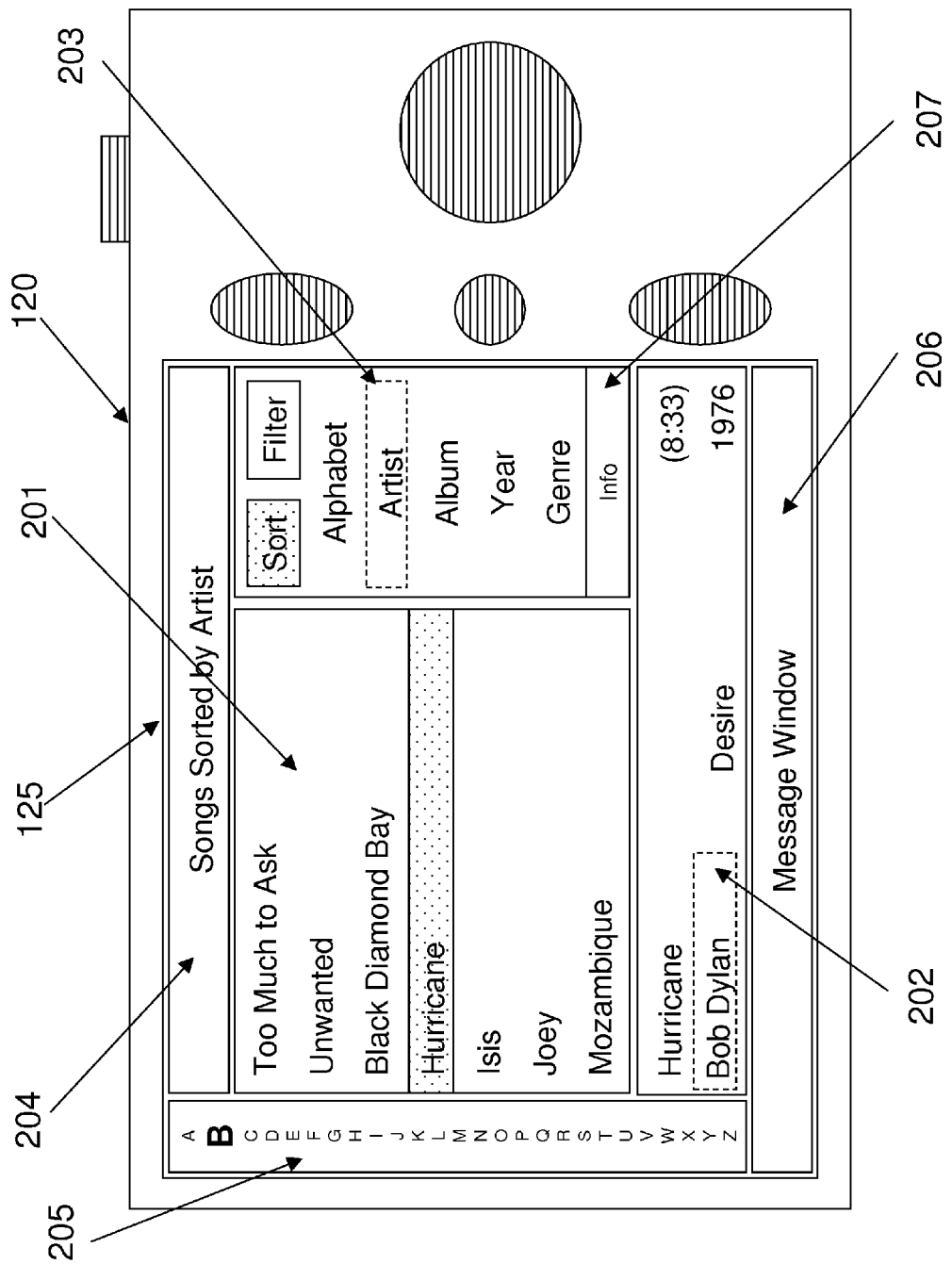
FIG. 3 shows an application of the method where the artist metadata is selected as the primary sort field in an embodiment of the present invention.

In the display represented in FIG. 2 and the song list in Table 1, the song database is listed by song title in alphanumeric order. Should the user decide to view the song database by selecting artist as the desired attribute, the songs are reorganized according to the artist attribute. The list, as reorganized alphabetically by artist, is shown in FIG. 3 and Table 2. In FIG. 3, the song "Hurricane" is still in focus in the main window (201), but now the songs displayed immediately adjacent to it are those most closely related to the artist attribute of the focus song. The songs are no longer shown alphanumerically; instead, the songs are being sorted alphanumerically by artist attribute. For example, the song "Black Diamond Bay" is a song by "Bob Dylan", which would be listed before any song by "Avril Lavigne" above the focus song. In contrast the song "Isis" is shown under the focus song and is also by Bob Dylan. In this example, all songs by Bob Dylan will be displayed before the next artist, Bonnie Raitt, as shown in Table 2. In the main window (201), the subclass of songs with the artist attribute may or may not be listed alphabetically, depending on the user preference. Therefore the user can quickly scan the list of songs noting that the artist attribute is highlighted in the focus window (202) for the focus song in the main window (201).

TABLE 2

| Item | SONG | ALBUM | ARTIST | GENRE | YEAR |
| --- | --- | --- | --- | --- | --- |
| 1 | Complicated | Let Go | Avril Lavigne | Rock | 2002 |
| 2 | Too Much to Ask | Let Go | Avril Lavigne | Rock | 2002 |
| 3 | Unwanted | Let Go | Avril Lavigne | Rock | 2002 |
| 4 | Black Diamond Bay | Desire | Bob Dylan | Rock | 1976 |
| 5 | Hurricane | Desire | Bob Dylan | Rock | 1976 |
| 6 | Isis | Desire | Bob Dylan | Rock | 1976 |
| 7 | Joey | Desire | Bob Dylan | Rock | 1976 |
| 8 | Mozambique | Desire | Bob Dylan | Rock | 1976 |
| 9 | Hell to Pay | Longing in Their Hearts | Bonnie Raitt | Rock | 1994 |
| 10 | I Ain't Gonna Let You Break My | Nick of Time | Bonnie Raitt | Rock | 1989 |
| 11 | You | Longing in Their Hearts | Bonnie Raitt | Rock | 1994 |
| 12 | Down to the Waterline | Dire Straits | Dire Straits | Rock | 1978 |
| 13 | Setting Me Up | Dire Straits | Dire Straits | Rock | 1978 |
| 14 | So Far Away | Brothers in Arms | Dire Straits | Rock | 1985 |
| 15 | Walk of Life | Brothers in Arms | Dire Straits | Rock | 1985 |
| 16 | Why Worry | Brothers in Arms | Dire Straits | Rock | 1985 |
| 17 | Your Latest Trick | Brothers in Arms | Dire Straits | Rock | 1985 |
| 18 | Better Days | Faith | Faith Hill | Country | 1998 |
| 19 | Love Ain't Like That | Faith | Faith Hill | Country | 1998 |
| 20 | Hypnotized | Mystery To Me | Fleetwood Mac | Rock | 1973 |
| 21 | Just Crazy Love | Mystery To Me | Fleetwood Mac | Rock | 1973 |
| 22 | The City | Mystery To Me | Fleetwood Mac | Rock | 1973 |
| 23 | Why | Mystery To Me | Fleetwood Mac | Rock | 1973 |
| 24 | Cold as Ice | Foreigner | Foreigner | Rock | 1977 |
| 25 | Woman in Black | 4 | Foreigner | Rock | 1981 |
| 26 | Free Bird | Pronounced Leh-Nerd Skin-Nerd | Lynyrd Skynyrd | Rock | 1973 |
| 27 | I Ain't the One | Pronounced Leh-Nerd Skin-Nerd | Lynyrd Skynyrd | Rock | 1973 |
| 28 | Tuesday's Gone | Pronounced Leh-Nerd Skin-Nerd | Lynyrd Skynyrd | Rock | 1973 |
| 29 | Africa Bamba | Supernatural | Santana | Rock | 1999 |
| 30 | Maria, Maria | Supernatural | Santana | Rock | 1999 |

TABLE 2-continued

| Item | SONG | ALBUM | ARTIST | GENRE | YEAR |
|---|---|---|---|---|---|
| 31 | Helter Skelter | The Beatles [White Album] Disc 2 | The Beatles | Rock | 1968 |
| 32 | Honey Pie | The Beatles [White Album] Disc 2 | The Beatles | Rock | 1968 |
| 33 | Ob-La-Di, Ob-La-Da | The Beatles [White Album] Disc 1 | The Beatles | Rock | 1968 |
| 34 | Revolution 9 | The Beatles [White Album] Disc 2 | The Beatles | Rock | 1968 |
| 35 | Sexy Sadie | The Beatles [White Album] Disc 2 | The Beatles | Rock | 1968 |
| 36 | Yer Blues | The Beatles [White Album] Disc 2 | The Beatles | Rock | 1968 |
| 37 | Already Gone | Their Greatest Hits (1971-1975) | The Eagles | Rock | 1976 |
| 38 | Best of My Love | Their Greatest Hits (1971-1975) | The Eagles | Rock | 1976 |
| 39 | Desperado | Their Greatest Hits (1971-1975) | The Eagles | Rock | 1976 |
| 40 | Lyin' Eyes | Their Greatest Hits (1971-1975) | The Eagles | Rock | 1976 |
| 41 | One of These Nights | Their Greatest Hits (1971-1975) | The Eagles | Rock | 1976 |
| 42 | Take It Easy | Their Greatest Hits (1971-1975) | The Eagles | Rock | 1976 |
| 43 | Tequila Sunrise | Their Greatest Hits (1971-1975) | The Eagles | Rock | 1976 |
| 44 | Witchy Woman | Their Greatest Hits (1971-1975) | The Eagles | Rock | 1976 |

Figure 4:
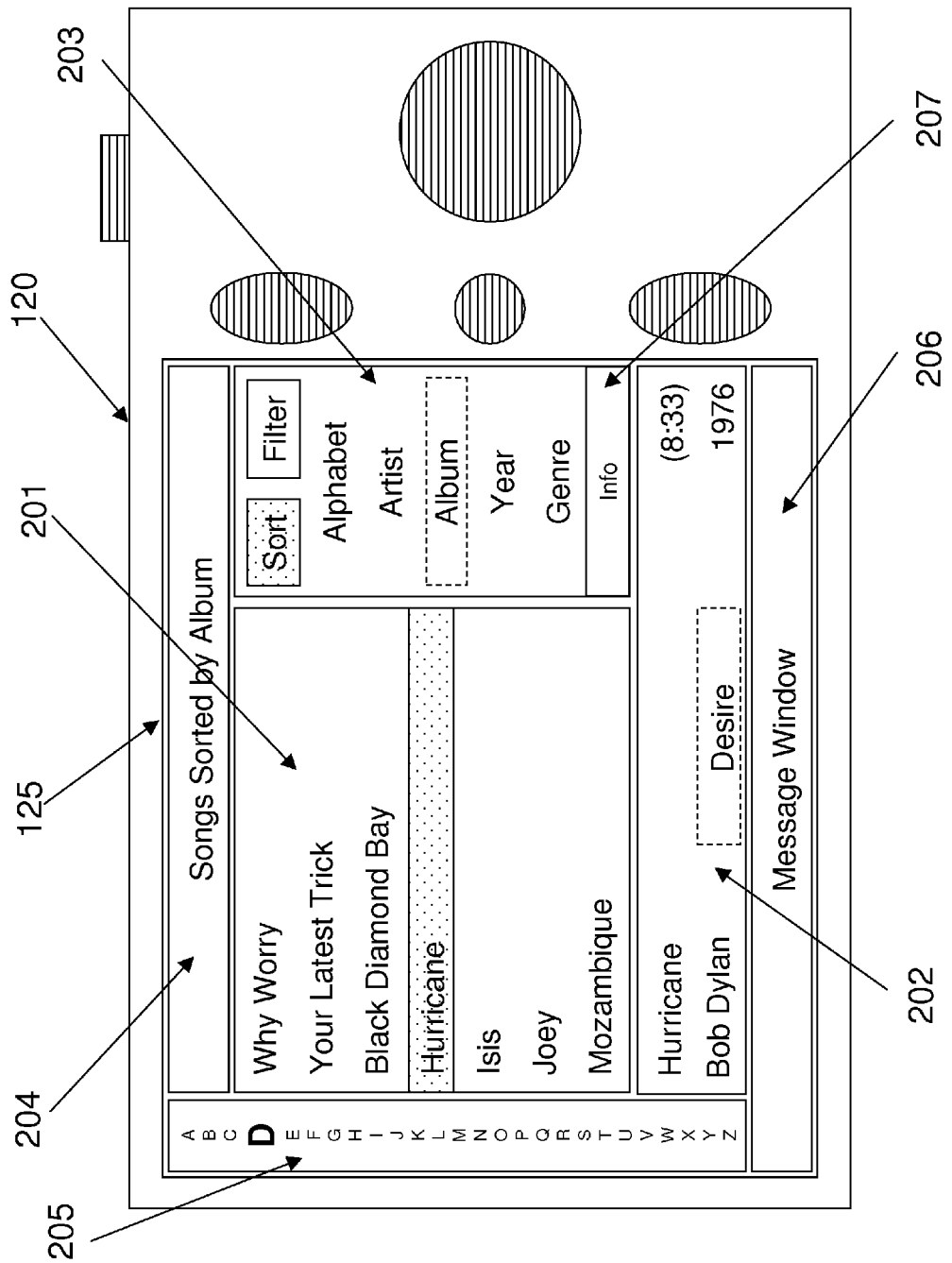
FIG. 4 shows an application of the method where the album metadata is used as the primary sort field in an embodiment of the present invention.

FIG. 4 and Table 3 show the reorganization of the list when "album" is selected as the attribute to use for sorting. In FIG. 4, the songs with an album attribute most closely related to the album attribute of the focus song are shown. The album attribute for the songs has been sorted alphabetically, but the songs are no longer sorted alphabetically. In this example, the single entry "Hurricane" is used as the pivot or focus point in the various searches of the song list via their attribute tags. In practice, a user will choose an attribute for the realization of the song entry list, then scroll the list, and choose a particular song entry for inclusion of the song in a play list or to play. Upon traversing the song list entries, the user may key on a particular attribute of the focus song in the focus window (202) and then decide to re-sort that list based on a different attribute in the sort/filter window (203). For example, "Hurricane", the focus song in the main window (201), was released in 1976. This information is shown in the focus window (202) and can be chosen in the sort/filter window (203). The user may decide to include some songs which were released in the 1970s on his song list.

Figure 5:
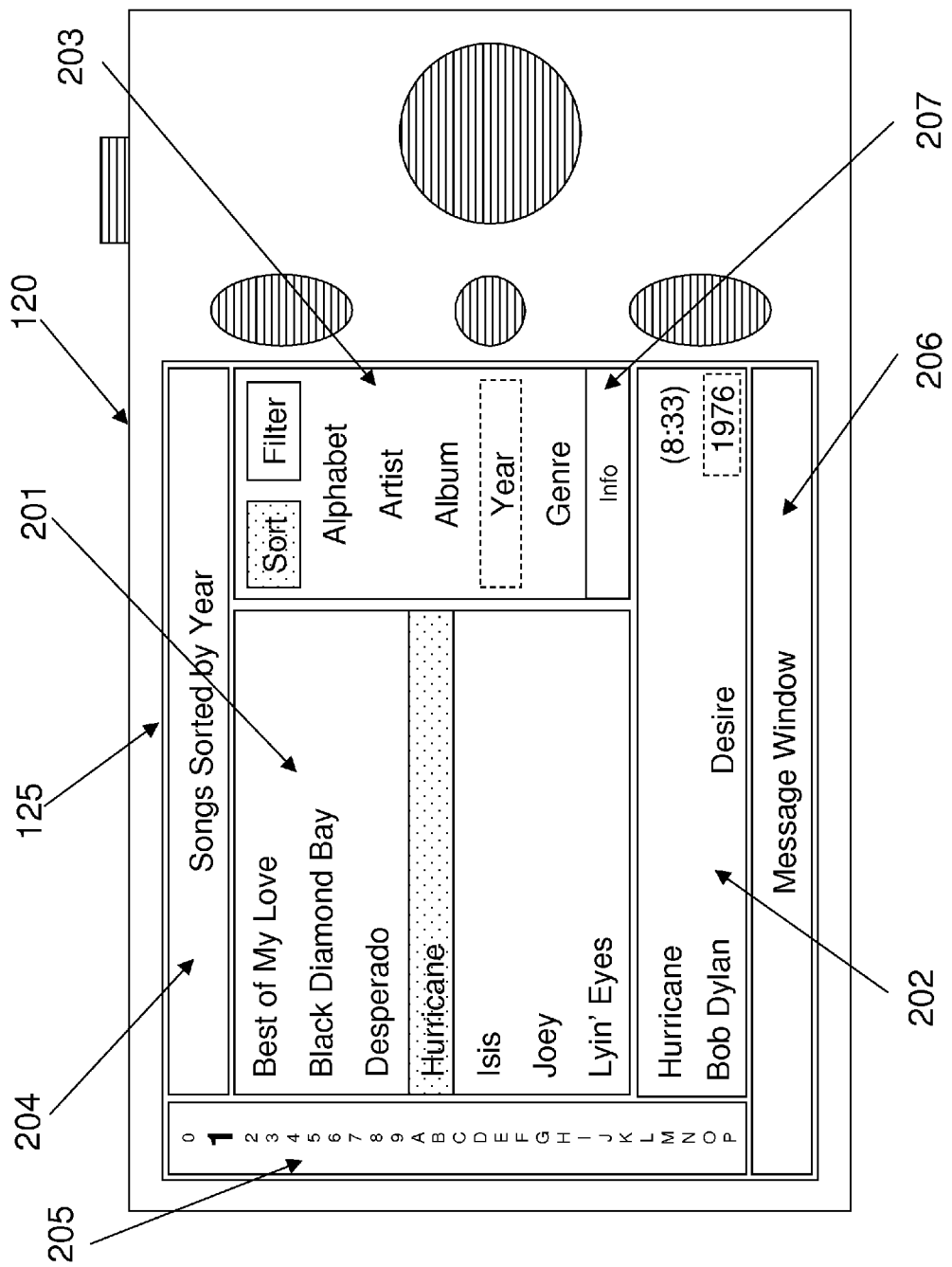
FIG. 5 shows another application of the method where the year metadata is used as the primary sort field in an embodiment of the present invention.
Figure 6:
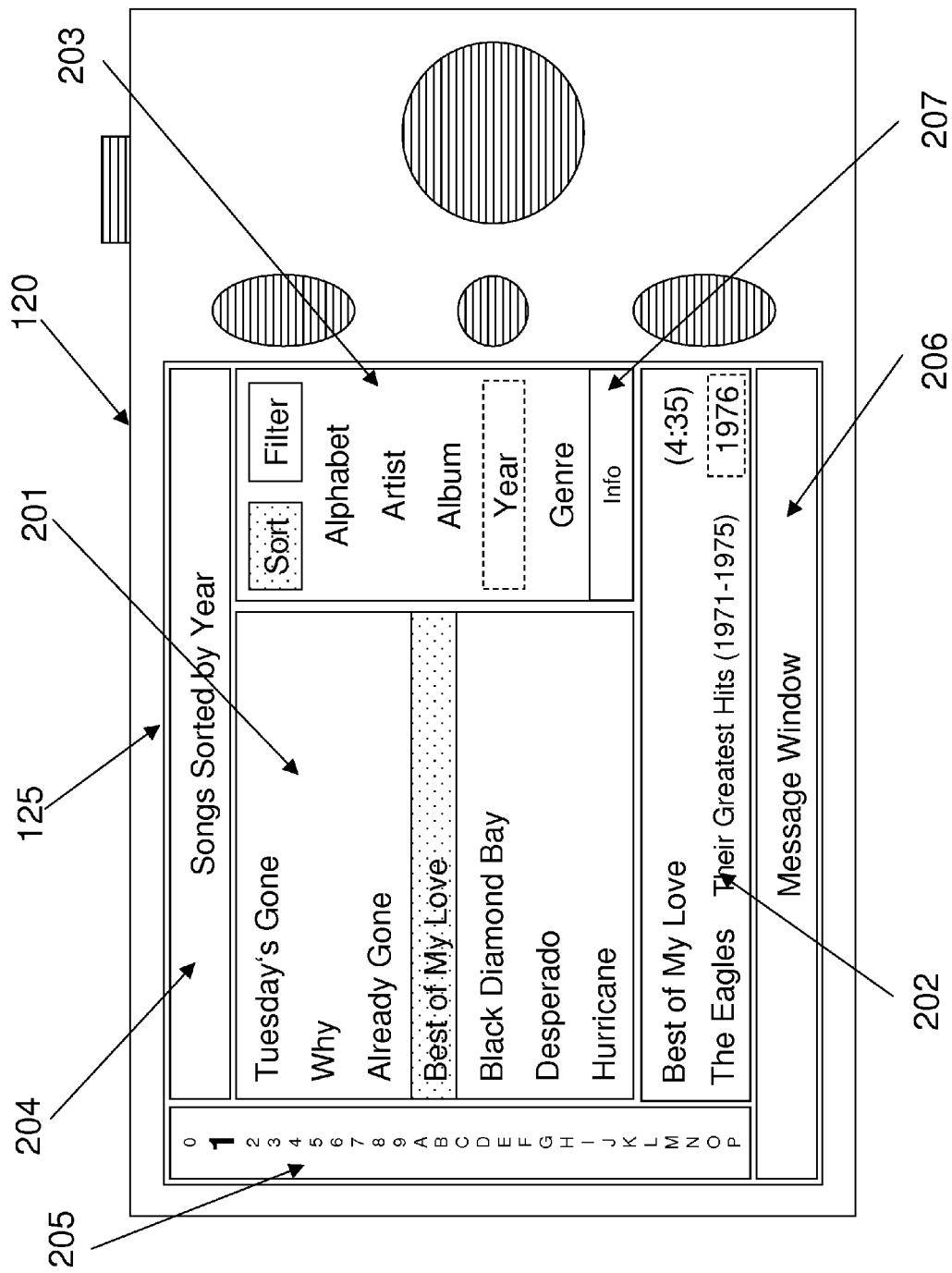
FIG. 6 shows the scrolling of the song entries to a song of interest into the center focus position.
Figure 7:
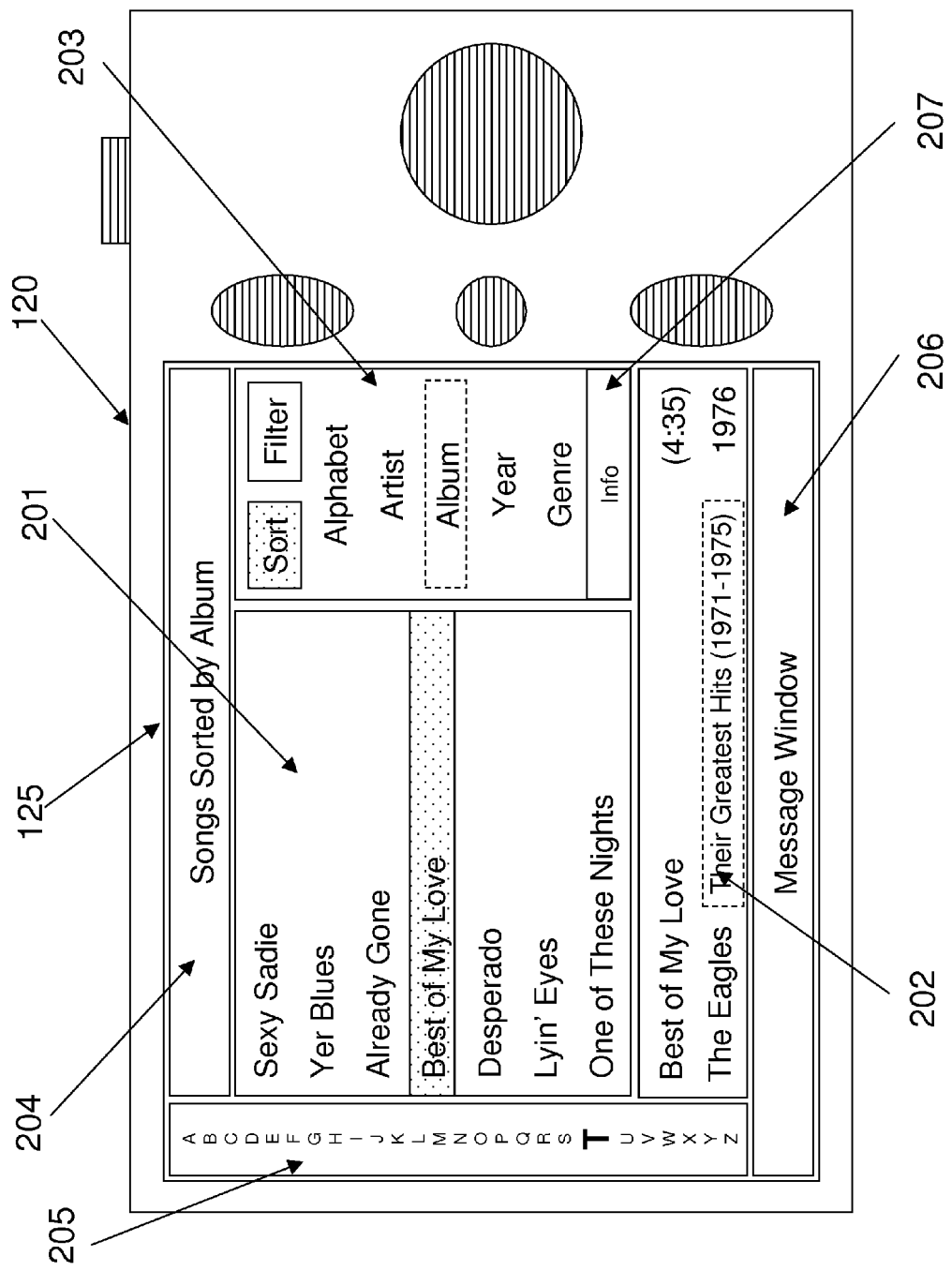
FIG. 7 shows a sort of the song entries by album, showing additional songs produced with the attribute "Their Greatest Hits (1971-1975)" for the entry with focus in an embodiment of the present invention.

Choosing to sort the list and pivot about the focus song using the year attribute will result in the list shown in the main window (201) of FIG. 5 and Table 4, which shows the entire database after re-sorting. The year attribute has been sorted numerically, and the songs are no longer listed alphanumerically. The songs nearest to the focus song "Hurricane", first by year then alphanumerically, include "Desperado" "Black Diamond Bay" and "Best of My Love", all produced in 1976, and then "Isis", "Joey", and "Lyin' Eyes", also all produced in 1976. Since the song "Best of My Love" was produced in the same decade as "Hurricane", the user might then scroll to select "Best of My Love" in the main window (201), as shown in FIG. 6. FIG. 6 also shows in the focus window (202) that "Best of My Love" was by the artist "The Eagles" from "Their Greatest Hits (1971-1975)". The user may then decide to add this song to the play list. In FIG. 7, the user has then selected to sort the list by album, to yield the songs from the album most closely associated with the attribute "Their Greatest Hits (1971-1975)". Table 3 is the re-sorted database for FIG. 7.

TABLE 3

| Item | SONG | ALBUM | ARTIST | GENRE | YEAR |
|---|---|---|---|---|---|
| 1 | Woman in Black | 4 | Foreigner | Rock | 1981 |
| 2 | So Far Away | Brothers in Arms | Dire Straits | Rock | 1985 |
| 3 | Walk of Life | Brothers in Arms | Dire Straits | Rock | 1985 |
| 4 | Why Worry | Brothers in Arms | Dire Straits | Rock | 1985 |
| 5 | Your Latest Trick | Brothers in Arms | Dire Straits | Rock | 1985 |
| 6 | Black Diamond Bay | Desire | Bob Dylan | Rock | 1976 |
| 7 | Hurricane | Desire | Bob Dylan | Rock | 1976 |
| 8 | Isis | Desire | Bob Dylan | Rock | 1976 |
| 9 | Joey | Desire | Bob Dylan | Rock | 1976 |
| 10 | Mozambique | Desire | Bob Dylan | Rock | 1976 |
| 11 | Down to the Waterline | Dire Straits | Dire Straits | Rock | 1978 |
| 12 | Setting Me Up | Dire Straits | Dire Straits | Rock | 1978 |
| 13 | Better Days | Faith | Faith Hill | Country | 1998 |
| 14 | Love Ain't Like That | Faith | Faith Hill | Country | 1998 |
| 15 | Cold as Ice | Foreigner | Foreigner | Rock | 1977 |
| 16 | Complicated | Let Go | Avril Lavigne | Rock | 2002 |
| 17 | Too Much to Ask | Let Go | Avril Lavigne | Rock | 2002 |
| 18 | Unwanted | Let Go | Avril Lavigne | Rock | 2002 |
| 19 | Hell to Pay | Longing in Their Hearts | Bonnie Raitt | Rock | 1994 |
| 20 | You | Longing in Their Hearts | Bonnie Raitt | Rock | 1994 |
| 21 | Hypnotized | Mystery To Me | Fleetwood Mac | Rock | 1973 |
| 22 | Just Crazy Love | Mystery To Me | Fleetwood Mac | Rock | 1973 |
| 23 | The City | Mystery To Me | Fleetwood Mac | Rock | 1973 |
| 24 | Why | Mystery To Me | Fleetwood Mac | Rock | 1973 |
| 25 | I Ain't Gonna Let You Break My | Nick of Time | Bonnie Raitt | Rock | 1989 |
| 26 | Free Bird | Pronounced Leh-Nerd Skin-Nerd | Lynyrd Skynyrd | Rock | 1973 |
| 27 | I Ain't the One | Pronounced Leh-Nerd Skin-Nerd | Lynyrd Skynyrd | Rock | 1973 |
| 28 | Tuesday's Gone | Pronounced Leh-Nerd Skin-Nerd | Lynyrd Skynyrd | Rock | 1973 |
| 29 | Africa Bamba | Supernatural | Santana | Rock | 1999 |
| 30 | Maria, Maria | Supernatural | Santana | Rock | 1999 |
| 31 | Ob-La-Di, Ob-La-Da | The Beatles [White Album] Disc 1 | The Beatles | Rock | 1968 |

TABLE 3-continued

| Item | SONG | ALBUM | ARTIST | GENRE | YEAR |
|---|---|---|---|---|---|
| 32 | Helter Skelter | The Beatles [White Album] Disc 2 | The Beatles | Rock | 1968 |
| 33 | Honey Pie | The Beatles [White Album] Disc 2 | The Beatles | Rock | 1968 |
| 34 | Revolution 9 | The Beatles [White Album] Disc 2 | The Beatles | Rock | 1968 |
| 35 | Sexy Sadie | The Beatles [White Album] Disc 2 | The Beatles | Rock | 1968 |
| 36 | Yer Blues | The Beatles [White Album] Disc 2 | The Beatles | Rock | 1968 |
| 37 | Already Gone | Their Greatest Hits (1971-1975) | The Eagles | Rock | 1976 |
| 38 | Best of My Love | Their Greatest Hits (1971-1975) | The Eagles | Rock | 1976 |
| 39 | Desperado | Their Greatest Hits (1971-1975) | The Eagles | Rock | 1976 |
| 40 | Lyin' Eyes | Their Greatest Hits (1971-1975) | The Eagles | Rock | 1976 |
| 41 | One of These Nights | Their Greatest Hits (1971-1975) | The Eagles | Rock | 1976 |
| 42 | Take It Easy | Their Greatest Hits (1971-1975) | The Eagles | Rock | 1976 |
| 43 | Tequila Sunrise | Their Greatest Hits (1971-1975) | The Eagles | Rock | 1976 |
| 44 | Witchy Woman | Their Greatest Hits (1971-1975) | The Eagles | Rock | 1976 |

TABLE 4

| Item | SONG | ALBUM | ARTIST | GENRE | YEAR |
|---|---|---|---|---|---|
| 1 | Helter Skelter | The Beatles [White Album] Disc 2 | The Beatles | Rock | 1968 |
| 2 | Honey Pie | The Beatles [White Album] Disc 2 | The Beatles | Rock | 1968 |
| 3 | Ob-La-Di, Ob-La-Da | The Beatles [White Album] Disc 1 | The Beatles | Rock | 1968 |
| 4 | Revolution 9 | The Beatles [White Album] Disc 2 | The Beatles | Rock | 1968 |
| 5 | Sexy Sadie | The Beatles [White Album] Disc 2 | The Beatles | Rock | 1968 |
| 6 | Yer Blues | The Beatles [White Album] Disc 2 | The Beatles | Rock | 1968 |
| 7 | Free Bird | Pronounced Leh-Nerd Skin-Nerd | Lynyrd Skynyrd | Rock | 1973 |
| 8 | Hypnotized | Mystery To Me | Fleetwood Mac | Rock | 1973 |
| 9 | I Ain't the One | Pronounced Leh-Nerd Skin-Nerd | Lynyrd Skynyrd | Rock | 1973 |
| 10 | Just Crazy Love | Mystery To Me | Fleetwood Mac | Rock | 1973 |
| 11 | The City | Mystery To Me | Fleetwood Mac | Rock | 1973 |
| 12 | Tuesday's Gone | Pronounced Leh-Nerd Skin-Nerd | Lynyrd Skynyrd | Rock | 1973 |
| 13 | Why | Mystery To Me | Fleetwood Mac | Rock | 1973 |
| 14 | Already Gone | Their Greatest Hits (1971-1975) | The Eagles | Rock | 1976 |
| 15 | Best of My Love | Their Greatest Hits (1971-1975) | The Eagles | Rock | 1976 |
| 16 | Black Diamond Bay | Desire | Bob Dylan | Rock | 1976 |
| 17 | Desperado | Their Greatest Hits (1971-1975) | The Eagles | Rock | 1976 |
| 18 | Hurricane | Desire | Bob Dylan | Rock | 1976 |
| 19 | Isis | Desire | Bob Dylan | Rock | 1976 |
| 20 | Joey | Desire | Bob Dylan | Rock | 1976 |
| 21 | Lyin' Eyes | Their Greatest Hits (1971-1975) | The Eagles | Rock | 1976 |
| 22 | Mozambique | Desire | Bob Dylan | Rock | 1976 |
| 23 | One of These Nights | Their Greatest Hits (1971-1975) | The Eagles | Rock | 1976 |
| 24 | Take It Easy | Their Greatest Hits (1971-1975) | The Eagles | Rock | 1976 |
| 25 | Tequila Sunrise | Their Greatest Hits (1971-1975) | The Eagles | Rock | 1976 |
| 26 | Witchy Woman | Their Greatest Hits (1971-1975) | The Eagles | Rock | 1976 |
| 27 | Cold as Ice | Foreigner | Foreigner | Rock | 1977 |
| 28 | Down to the Waterline | Dire Straits | Dire Straits | Rock | 1978 |
| 29 | Setting Me Up | Dire Straits | Dire Straits | Rock | 1978 |
| 30 | Woman in Black | 4 | Foreigner | Rock | 1981 |
| 31 | So Far Away | Brothers in Arms | Dire Straits | Rock | 1985 |
| 32 | Walk of Life | Brothers in Arms | Dire Straits | Rock | 1985 |
| 33 | Why Worry | Brothers in Arms | Dire Straits | Rock | 1985 |
| 34 | Your Latest Trick | Brothers in Arms | Dire Straits | Rock | 1985 |
| 35 | I Ain't Gonna Let You Break My | Nick of Time | Bonnie Raitt | Rock | 1989 |
| 36 | Hell to Pay | Longing in Their Hearts | Bonnie Raitt | Rock | 1994 |
| 37 | You | Longing in Their Hearts | Bonnie Raitt | Rock | 1994 |
| 38 | Better Days | Faith | Faith Hill | Country | 1998 |
| 39 | Love Ain't Like That | Faith | Faith Hill | Country | 1998 |
| 40 | Africa Bamba | Supernatural | Santana | Rock | 1999 |
| 41 | Maria, Maria | Supernatural | Santana | Rock | 1999 |
| 42 | Complicated | Let Go | Avril Lavigne | Rock | 2002 |
| 43 | Too Much to Ask | Let Go | Avril Lavigne | Rock | 2002 |
| 44 | Unwanted | Let Go | Avril Lavigne | Rock | 2002 |

Figure 8:
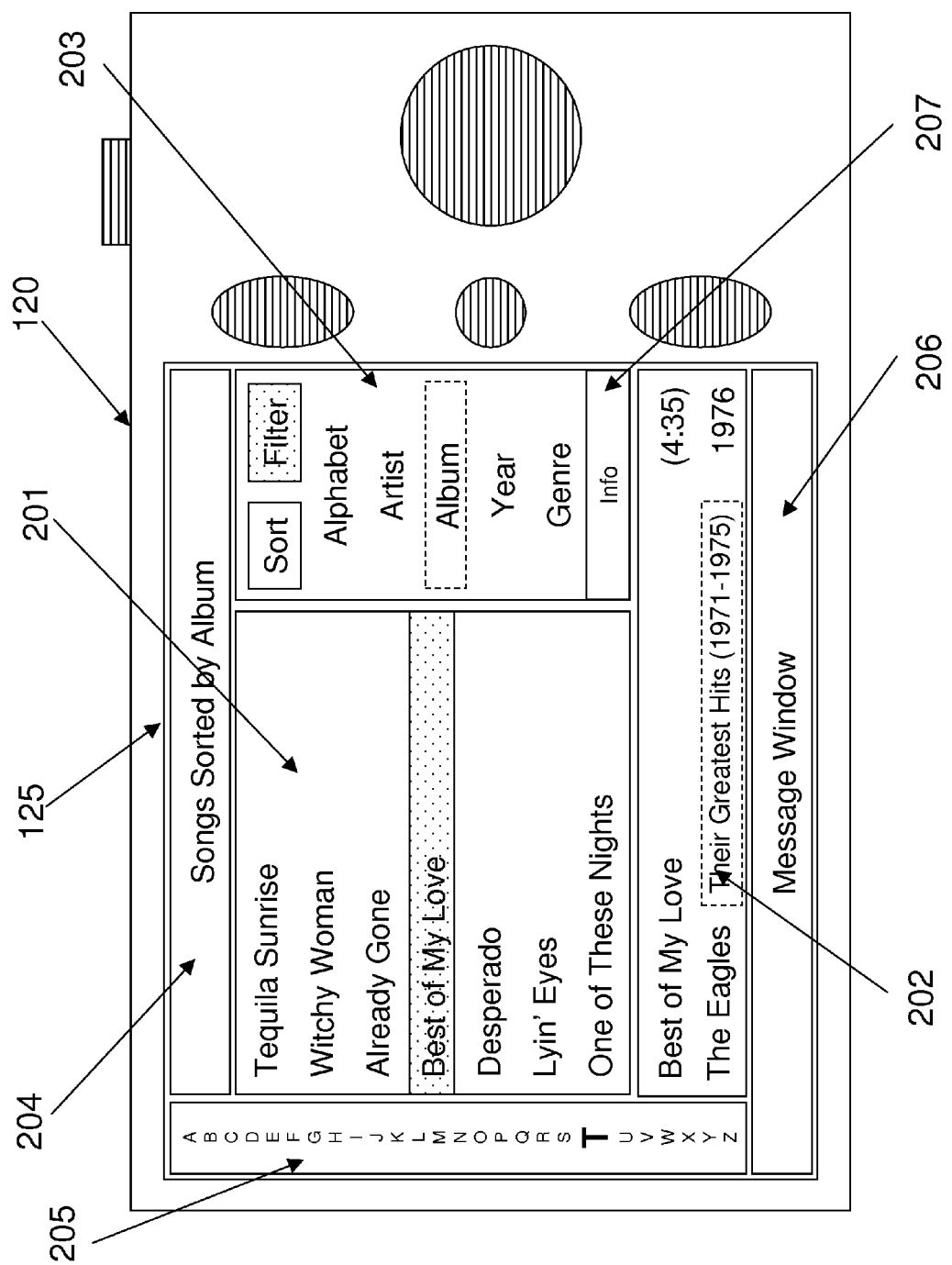
FIG. 8 shows an application of a filtering function to the song entries in the database in an embodiment of the present invention.

Besides providing a sort of the entire list of songs based on song attributes as discussed above, filters may also be invoked which limit the number of song entries to be displayed during an intelligent associative search of the database. The filters provide a way to perform more constrained associative sorting. An example of this is shown in FIG. 8, where the album filter is implemented in the sort/filter window (203). In this example, the album attribute is selected thus limiting the number of songs to be displayed from the entire database. In this embodiment, the songs from the album "Their Greatest Hits (1971-1975)" are wrapped around in the list, with "Best of My Love" still maintaining focus. Filtering is particularly important for a media device with a large amount of stored data. Tens of thousands of songs might be part of a large song database, and the management of those songs via the intelligent associative method of the present invention is further enhanced by the use of filters to limit the scope of the entire database to be traversed during the construction or management of songs for playback or creation of play lists.

In another embodiment of the invention, multiple attributes can be chosen to sort or filter the database.

This intelligent association of navigating around the database is a methodology that allows the user to quickly maneuver from one metadata category to the next without having to "back up and out" of the current metadata category used in traditionally hierarchically schemes that are so prevalent on today's portable devices. In addition, the methodology allows the user to filter metadata to progressively narrow the scope of entries. In this way, the user can quickly eliminate entries the user does not want to browse through, allowing a streamlined method for viewing only the entries associated with the metadata in which the user is interested. This intelligent association filter can be used for multiple metadata entries, and not just the traditionally "one level deep" way of sorting data entries. For example, if a user wishes to sort their entire database of song files, they typically have the options of viewing all song entries, or sorting according to artist, genre, album, etc.

In prior art devices, while viewing the "all songs" option, if the user comes upon a song in which he wants to query other songs associated on the same album, the user is forced to "back out" of the all songs option, go into the albums section and scroll through the entire albums database entries, until he finds the album he is interested in. At this point, he can choose that album to view the song list associated with that album. If the user then wishes to view all songs associated with that artist, he would have to "back out" of the album option, go into the artist option, view the entire database of artist until the one the user is looking for appears, and then select that artist in order to view all songs associated with the artist he is interested in. This methodology can become quite cumbersome, especially as portable media players continually increase their memory size, allowing for larger databases and more media entries (such as songs) to be sorted through. The devices and methods of the present invention eliminate the need to back out and manually scroll through entries by category.

Another feature that is increasingly important for portable media players, or remotes with limited screen sizes, is the ability to search for specific entries in a database. A device with a limited screen size, as defined herein, is a device with a degree of portability, for example, a device that is small enough to be held in one hand. The option of doing a text search for a data entry that is only partially known becomes important as database sizes continue to grow. For instance, assume a user remembers a song she really liked, however, the only thing that she can remember is the name "Summer" associated with it; she does not remember the song title, artist or album. In traditional devices, the search for this entry could be extremely long and drawn out, searching for any artist, album or song with "Summer" in the title. In contrast, in the present invention, the user can type in a name in the search field, dynamically displaying any entries in the database with the same order of lettering the user types in for any of the metadata contents.

Another preferred method of the invention is the listing of the attributes (metadata) associated with the current entry with focus. For example, in FIG. 2 the song "Hurricane" has focus, and as such the focus window (202) displays metadata associated with the entry "Hurricane". In addition, since the sort/filter window (203) indicates sorting alphanumerically by song, the song title "Hurricane" is highlighted in the focus window (202). This notifies the user which attribute of the data entry has been chosen to sort about. This is important to provide immediate feedback to the user for the purpose of promoting associative connections by the user. The user can then scroll through any of the attributes displayed in the focus window (202) to re-sort how the data entries are displayed in the main window (201). As an example, the user can scroll from the song title attribute, which in this case is "Hurricane", down to the artist title attribute, which is "Bob Dylan", to resort the list box according to songs associated with artist. In this case the list would pivot about Bob Dylan's "Hurricane" and repopulate the list alphanumerically first by artist, next by song, in a similar manner as discussed above in relation to FIG. 3.

In this preferred embodiment of the invention, the alphanumeric window (205), highlights the first number/letter of the focus song in the main window (201). In this case, the list is sorted alphanumerically and the song "Hurricane" has focus. Thus the letter "H" is highlighted in the alphanumeric list. In a similar manner, shown in FIG. 3, "Hurricane" still has focus. However the list is sorted according to artist, such that the artist "Bob Dylan" is highlighted in the focus window (202), and the letter "B" is highlighted in the alphanumeric window (205). This notifies the user that the database list is formed alphanumerically by artist, with the songs associated with that artist grouped together alphanumerically as well. The user also has the capability to scroll through the artist list and display the songs associated with that artist simply by scrolling up or down in the alphanumeric window (205). This feature provides an immediate clue to the user as to where he is located spatially in the current sorted list. As the user scrolls down, the alphanumeric letter entry changes with the first number/letter in the attribute field. Other visual clues may be used such as colors, outlines, etc to provide feedback to the user for the purpose of enhancing the association of the song entries.

A preferred embodiment of the invention allows the user to create a dynamic play list that is resident on the docking station or the remote control and controls the connected portable media device for the purpose of playing the media files. The play lists are named and stored in the device memory; either in the memory of the handheld interface unit (the remote control) or the media player docking station, so that these play lists can be loaded, manipulated, changed and renamed at will. Therefore, the play lists that are created through the associative search process empowered by a method of the present invention are stored for use with the portable media device at a later time. An advantage of the present invention is that the play lists can be named and stored on the remote control device, independent of the media player storage ability or capacity. The play list entries may be managed using the intelligent associative methodology of the present invention allowing for addition of more content from the main database of the media player or of the content of other play lists.

Entries in the play list may be moved, copied, or removed and/or additional content may be added from the main database or other play lists previously constructed, dynamically at the user's discretion. This full editing and management capability is a powerful "disc jockey" capability allowing full control of the addition and manipulation of entries for any play list, while the play list is queued for playback via the satellite base station or for the generation and manipulation of new play lists without the requirement that a portable media player, such as an iPod® media device, be connected to the docking station. This is as powerful as typical portable computer applications. The method of the present invention also allows for successful and intelligent navigation previously limited by the size of the view screen of portable devices.

Furthermore, the media play lists are stored for each portable media player that has been docked to the remote control data management system of the present invention. Therefore, the user can manipulate, manage, change and rename the play lists of that media player even after it has been removed from the docking station. Then, upon re-insertion of that media player, the associated playlist will be available to play back the data entries that had been modified when the portable media player was not connected. Another attribute of this invention is that the metadata for all data entries, regardless of which portable media device it was downloaded from, will be made available to the user. In this manner, the user can chose a data entry which the user wishes to make part of their own media collection, by selecting that entry for purchase or marking it for purchase at a later time. In one embodiment, there will be a visual indication to the user of the media content that is unavailable to the particular media player currently docked. For example, the songs that have not been purchased for the media player that is currently docked may be highlighted by being grayed out in the display list. This cross fertilization allows a user that has had several portable media devices docked in the remote control device to obtain media content from another media device at a later date. This facilitates the exchange of media entries from user to user of the remote control device, a particularly useful attribute for the owner of the remote control device.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of displaying data extracted from a non-transitory computer-readable database stored on a computer-readable storage medium, comprising the steps of:
    a) receiving a selection of a first media file as a first focus media file for sorting a plurality of media files;
    b) receiving a value of a selection attribute from a plurality of attributes of the first focus media file;
    c) organizing the media files based on the value of the selection attribute of the first focus media file;
    d) displaying on a display device at least one attribute of the first focus media file, wherein the first focus media file is centered in a list of the viewable media files ordered by a similarity of a value of the selection attribute of the other media files in relation to the value of the selection attribute of the first focus media file;
    wherein the first focus media file remains as a center focus entry in a center of a viewable display of the list while the other media files are being organized and displayed around the first focus media file;
    e) receiving a value of a different attribute as the selection attribute;
    f) repeating steps c) and d) such that the media files other than the first focus media file are reordered around the first focus media file according to the similarity of a value of the different attribute of the other media files in relation to the value of the different attribute of the first focus media file while the first focus media file remains as the center focus entry in the viewable display;
    g) receiving a selection of a second media file as a second focus media file for sorting the media files;
    h) receiving a value of a selection attribute of the second focus media file;
    i) reorganizing the media files based on a similarity of a value of the selection attribute of the other media files to the value of the selection attribute of the second focus media file; and
    j) displaying on the display device at least one attribute of the second focus media file, wherein the second focus media file is centered in a list of the viewable media files ordered by the similarity of the value of the selection attribute of the other media files in relation to the value of the selection attribute of the second focus media file;
    wherein the second focus media file remains as a center focus entry in the center of the viewable display of the list while the media files are being reorganized and displayed around the second focus media file.

2. The method of claim 1, wherein the media files comprise digital media files.

3. The method of claim 2, wherein the media files each comprise a song.

4. The method of claim 3, wherein the selection attribute is selected from the group consisting of album, artist, song name, album name, year released, genre, length of song, composer, lyrics and record label.

5. The method of claim 1, further comprising the step of filtering out a plurality of media files based on the value of at least one attribute of the first focus media file.

6. The method of claim 1, wherein the media files are organized alphanumerically by the selection attribute.

7. The method of claim 1, further comprising the step of scrolling through the list, while maintaining a focus on the file located at the center of the display.

8. The method of claim 7, wherein the scrolling step uses an alphanumeric window shown on the display to navigate through the media files sorted alphanumerically by the value of the selection attribute.

9. The method of claim 1, wherein the method is performed using a remote control data management system comprising a docking station and a remote control unit wirelessly connected to the docking station.

10. The method of claim 9, further comprising the steps of:
    k) connecting a media player to the docking station;
    l) downloading metadata about a plurality of media entries from the media player into the docking station;
    m) storing the downloaded metadata in a device separate from the media player; and
    n) creating at least one database from the metadata in either the docking station or the remote control data management system.

11. The method of claim 10, wherein the device separate from the media player is selected from the group consisting of the docking station and the remote control unit.

12. The method of claim 10, wherein the metadata includes playlists.

13. The method of claim 12, further comprising the step of editing the database created in step n), wherein this step is performed in a device separate from the media player.

14. The method of claim 13, wherein the step of editing the database comprises at least one of the substeps selected from the group consisting of:
    a) adding a media entry to a playlist;
    b) deleting a media entry from the playlist;
    c) reordering a playlist;
    d) creating a playlist;
    e) naming a playlist;
    f) changing a name of a playlist; and
    g) any combination of a) through f).

15. The method of claim 10, further comprising the step of retaining the metadata after the media player is disconnected from the docking station.

16. The method of claim 10, further comprising the step of commanding the media player to play a file.

17. The method of claim 16, further comprising the step of maintaining a unique identifier for each media player that has been connected to the docking station.

18. The method of claim 17, further comprising the steps of purchasing and downloading the media not on the connected media player.

19. The method of claim 16, further comprising the step of notifying a user if a playlist contains media not on a connected media player.

20. The method of claim 10, further comprising the step of storing downloaded metadata from at least two media players.

21. A method of displaying data extracted from a non-transitory computer-readable database stored on a computer-readable storage medium, using a processor to perform at least a portion of one or more of the following steps:
   a) receiving a selection of a first media file as a first focus media file for sorting a plurality of media files;
   b) receiving a value of a selection attribute from a plurality of attributes of the first focus media file;
   c) organizing the media files based on the value of the selection attribute of the first focus media file;
   d) displaying on a display device at least one attribute of the first focus media file, wherein the first focus media file is centered in a list of the viewable media files ordered by a similarity of a value of the selection attribute of the other media files in relation to the value of the selection attribute of the first focus media file;
   wherein the first focus media file remains as a center focus entry in a center of a viewable display of the list while the other media files are being organized and displayed around the first focus media file;
   e) receiving a value of a different attribute as the selection attribute;
   f) repeating steps c) and d) such that the media files other than the first focus media file are reordered around the first focus media file according to the similarity of a value of the different attribute of the other media files in relation to the value of the different attribute of the first focus media file while the first focus media file remains as the center focus entry in the viewable display;
   g) receiving a selection of a second media file as a second focus media file for sorting the media files;
   h) receiving a value of a selection attribute of the second focus media file;
   i) reorganizing the media files based on a similarity of a value of the selection attribute of the other media files to the value of the selection attribute of the second focus media file; and
   j) displaying on the display device at least one attribute of the second focus media file, wherein the second focus media file is centered in a list of the viewable media files ordered by the similarity of the value of the selection attribute of the other media files in relation to the value of the selection attribute of the second focus media file;
   wherein the second focus media file remains as a center focus entry in the center of the viewable display of the list while the media files are being reorganized and displayed around the second focus media file.

22. A method of displaying data extracted from a non-transitory computer-readable database stored on a computer-readable storage medium, comprising the steps of:
   a) receiving a selection of a first media file as a first focus media file for sorting a plurality of media files;
   b) receiving a value of a selection attribute from a plurality of attributes of the first focus media file;
   c) organizing the media files based on the value of the selection attribute of the first focus media file;
   d) displaying on a display device at least one attribute of the first focus media file, wherein the first focus media file is viewable in a list of the viewable media files ordered by a similarity of a value of the selection attribute of the other media files in relation to the value of the selection attribute of the first focus media file;
   wherein the first focus media file remains in view on a viewable display of the list while the other media files are being organized and displayed around the first focus media;
   e) receiving a value of a different attribute as the selection attribute; and
   f) repeating steps c) and d) such that the media files other than the first focus media file are reordered around the first focus media file according to the similarity of a value of the different attribute of the other media files in relation to the value of the different attribute of the first focus media file while the first focus media file remains as the center focus entry in the viewable display;
   g) receiving a selection of a second media file as a second focus media file for sorting the media files;
   h) receiving a value of a selection attribute of the second focus media file;
   i) reorganizing the media files based on a similarity of a value of the selection attribute of the other media files to the value of the selection attribute of the second focus media file; and
   j) displaying on the display device at least one attribute of the second focus media file, wherein the second focus media file is centered in a list of the viewable media files ordered by the similarity of the value of the selection attribute of the other media files in relation to the value of the selection attribute of the second focus media file;
   wherein the second focus media file remains as a center focus entry in the center of the viewable display of the list while the media files are being reorganized and displayed around the second focus media file.

* * * * *

UNITED STATES PATENT AND TRADEMARK OFFICE
CERTIFICATE OF CORRECTION

PATENT NO.       : 8,572,025 B2                                    Page 1 of 1
APPLICATION NO.  : 12/643315
DATED            : October 29, 2013
INVENTOR(S)      : Smolinski et al.

It is certified that error appears in the above-identified patent and that said Letters Patent is hereby corrected as shown below:

In the claims:

Claim 22 (Column 22, line 25): replace "media;" with "media file;"

Signed and Sealed this
Eleventh Day of February, 2014

Michelle K. Lee
*Deputy Director of the United States Patent and Trademark Office*